United States Patent [19]

Paitula

[11] 4,128,261
[45] Dec. 5, 1978

[54] LOCKING DEVICE FOR VEHICLE SAFETY SEAT BELTS

[75] Inventor: Hannu O. Paitula, Järna, Sweden

[73] Assignee: Gränges Essem Aktiebolag Fack, Västerås, Sweden

[21] Appl. No.: 811,769

[22] Filed: Jun. 30, 1977

[30] Foreign Application Priority Data

Jul. 1, 1976 [SE] Sweden .............................. 7607522

[51] Int. Cl.² ............................................. B60R 21/10
[52] U.S. Cl. .................................... 280/744; 280/747
[58] Field of Search ....................... 280/744, 745, 747; 297/386, 389; 226/183, 195, 25

[56] References Cited

U.S. PATENT DOCUMENTS

| 3,400,977 | 9/1968 | Jones | 280/744 |
| 3,588,173 | 6/1971 | Apri | 297/386 |

FOREIGN PATENT DOCUMENTS

| 1480245 | 2/1969 | Fed. Rep. of Germany | 280/744 |
| 1006966 | 10/1965 | United Kingdom | 280/744 |
| 1069402 | 5/1967 | United Kingdom | 280/744 |
| 1227981 | 4/1971 | United Kingdom | 280/747 |
| 1236051 | 6/1971 | United Kingdom | 280/747 |

*Primary Examiner*—Robert R. Song
*Attorney, Agent, or Firm*—Browdy and Neimark

[57] ABSTRACT

A locking device for safety belts in vehicles of the type in which a strap of the seat belt is automatically retracted into a housing when the seat belt is not used. The device comprises at least two parallel, rotatably mounted rollers and the strap runs between and around the rollers. One roller is undisplaceable and the other roller is movable in an arcuate path between a free position and a locking position. The movable roller is normally maintained in the free position, in which the rollers can rotate, so that the strap can be extended. During rapid extension of the strap, the movable roller is moved to a locking position, in which the rollers can not rotate, so that the strap can not be further extended.

11 Claims, 2 Drawing Figures

LOCKING DEVICE FOR VEHICLE SAFETY SEAT BELTS

BACKGROUND OF THE INVENTION

The present invention is related to a locking device for safety seat belts in vehicles of the kind in which a seat belt strap is automatically retracted, at least partially, into a housing when the seat belt is not used. The locking device is primarily intended to be used in safety seat belts of the kind in which the strap is retracted into a housing without being wound on a spindle or similar means associated with a reel.

It is previously known to collect the retracted strap of automatically retractable safety seat belts in folds or loops which run more or less freely in a limited space. In this way the use of a rotatable spindle for winding up the strap is avoided, thus facilitating the positioning of the seat belt retracting device in the vehicle, as the space requirement can more easily be met. Due to the increase in the number of possible locations, the advantage is obtained that it often is possible to decrease the required length of the seat belt strap. Furthermore, the advantage is obtained that the force necessary for extraction of the seat belt strap will be substantially constant during the extraction. When the strap is wound on a spindle connected to a helical spring which is tensioned when the strap is extracted and then provides the automatic retraction of the strap, when the seat belt is not used, the force required for the extraction of the strap will increase gradually during the extraction of the strap, because the diameter of the strap reel is gradually decreasing during the extraction. The properties of the spring have a comparatively small influence on the variation in the necessary extraction force and, therefore, this variation is mainly due to the varying diameter of the strap reel. An increase of the extraction force during the extraction of the seat belt is a considerable disadvantage, beacause the pressure from the seat belt can be uncomfortable to the person using the seat belt.

In retracting devices in which the retracted strap is laid in folds or loops, two or more rollers are normally used for driving and locking the strap, the strap running around the rollers and one of the rollers beeing connected to a spring which is tensioned during the extraction of the strap and which then automatically causes the roller to rotate in the opposite direction for retraction of the strap, when the seat belt is not used. Several embodiments are known in which these rollers enable the locking of the strap when the strap is rapidly extracted, for instance in case of a rapid braking of the vehicle, so that a strap-sensitive locking device is provided for the strap. However, these embodiments have been comparatively complicated and, furthermore, have not always provided a sufficently rapid and safe locking of the strap in critical situations. Some locking devices have also caused heavy wearing of the strap when locking, and this means in the long run a decrease in the reliability of the seat belt.

SUMMARY OF THE INVENTION

The main object of the present invention is to provide a locking device for safety seat belts of the kind mentioned in the introduction which provides a rapid and safe locking of the strap when the strap is rapidly extracted without any risk of decrease in strap strength due to wearing when the strap is locked, and which furthermore is very simple in design and therefore reliable and easy to manufacture and adjust. A further object is to provide a locking device which can easily be provided with a vehicle-sensitive locking device, for instance a tiltable member or a pendulum, so that locking also is obtained due to vehicle movements. According to the invention, these objects are obtained by giving the locking device the features set forth in claim 1.

Due to the fact that the strap is continuosly pressed between two rollers, one of which being moved to a locking position when the strap is to be locked, only a comparatively small movement of the displaceable roller is required for providing the locking of the strap, which gives a rapid locking. Furthermore, the wearing of the strap is reduced to a minimum. Furthermore, a continuous pressing of the strap is obtained, so that the strap is always kept smooth which contributes to increased safety for the person wearing the seat belt.

BRIEF DESCRIPTION OF THE DRAWINGS

One embodiment of the invention will now be described with reference to the attached drawings.

DESCRIPTION OF THE PREFERRED EMBODIMENT

Figure 1:
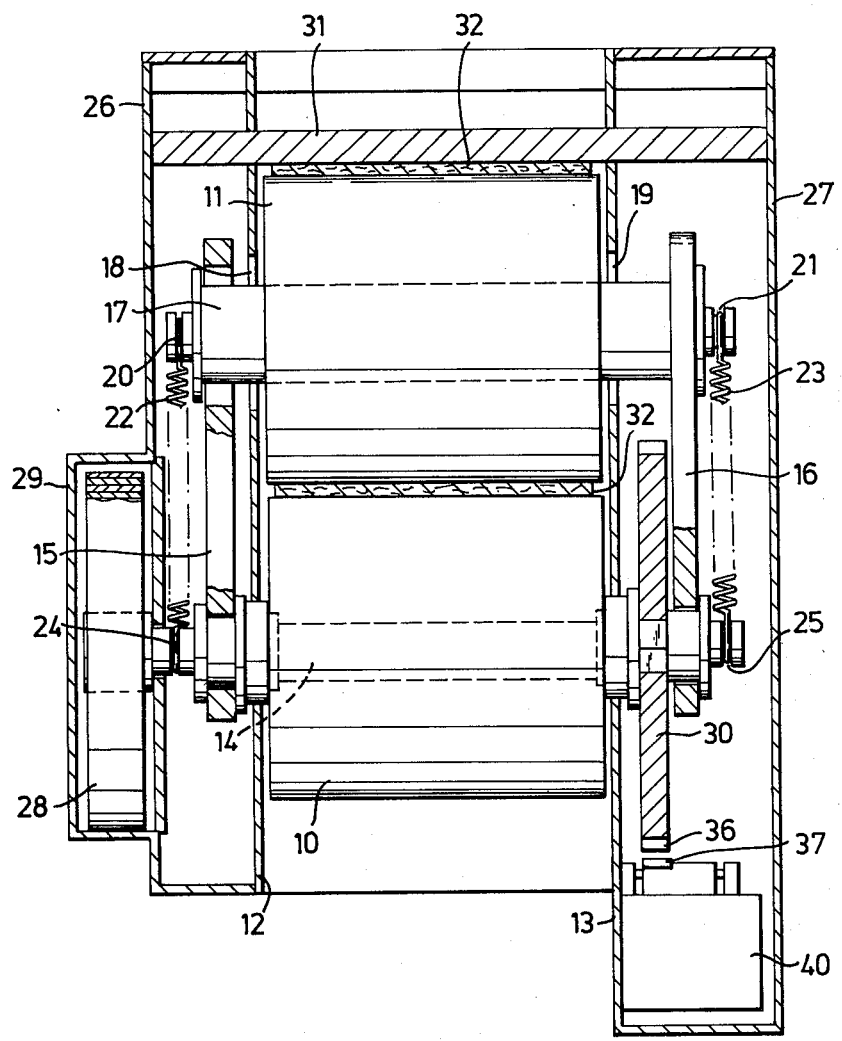
FIG. 1 is a front view, in cross section, of a locking device according to the invention.

The locking device shown in FIG. 1 comprises a first roller 10 and a second roller 11, which are rotatable and positioned in parallel with respective to one another between two parallel walls 12,13 which form a space for collecting the strap of the seat belt, when this is being used. The first roller 10 is attached to a shaft 14 which is rotatably mounted in the two side walls. The ends of the shaft extend on both sides of these walls, and on each one of the shaft ends an arm 15 or 16, is rotatably mounted at one end. The other ends of the arms 15,16 are connected to a shaft 17 which extends through slots 18,19 in the walls 12,13, as more clearly shown in FIG. 2. The roller 11 is rotatably mounted on the shaft 17. The two ends of shaft 17 extend on both sides of the arms 15,16 and are each provided with a groove 20 and 21, respectively, which serves as an attachement for one end of a draw spring 22, or 23, respectively. These springs 22,23 are at the other end attached in grooves 24,25 on the shaft 14 and are arranged to press the rollers 10,11 against respective to one another. The shaft 15 and the spring 22 are enclosed in a cover 26 which is attached to the outside of the wall 12, and the arm 16 and the spring 23 are enclosed in a cover 27 which is attached to the outside of the wall 13.

As shown to the left in FIG. 1, the shaft 14 is at one end connected with a helical spring 28 one end of which being attached to the shaft 14 and the other end being attached to a cover 29 which encloses the spring and which is attached to the outside of the cover 26. The shaft 14 is at its other end, as shown to the right in FIG. 1, provided with a gear wheel 30, which is unrotatably attached to the shaft. The function of the wheel 30 will be described more in detail below.

A stop means 31 is attached to the walls 12 and 13 at one end of the slots 18, 19 and extends its ends to the covers 26 and 27. This stop means is arcuate, as shown in FIG. 2, and provides the locking of the roller 11, as will be described in more detail below.

Figure 2:
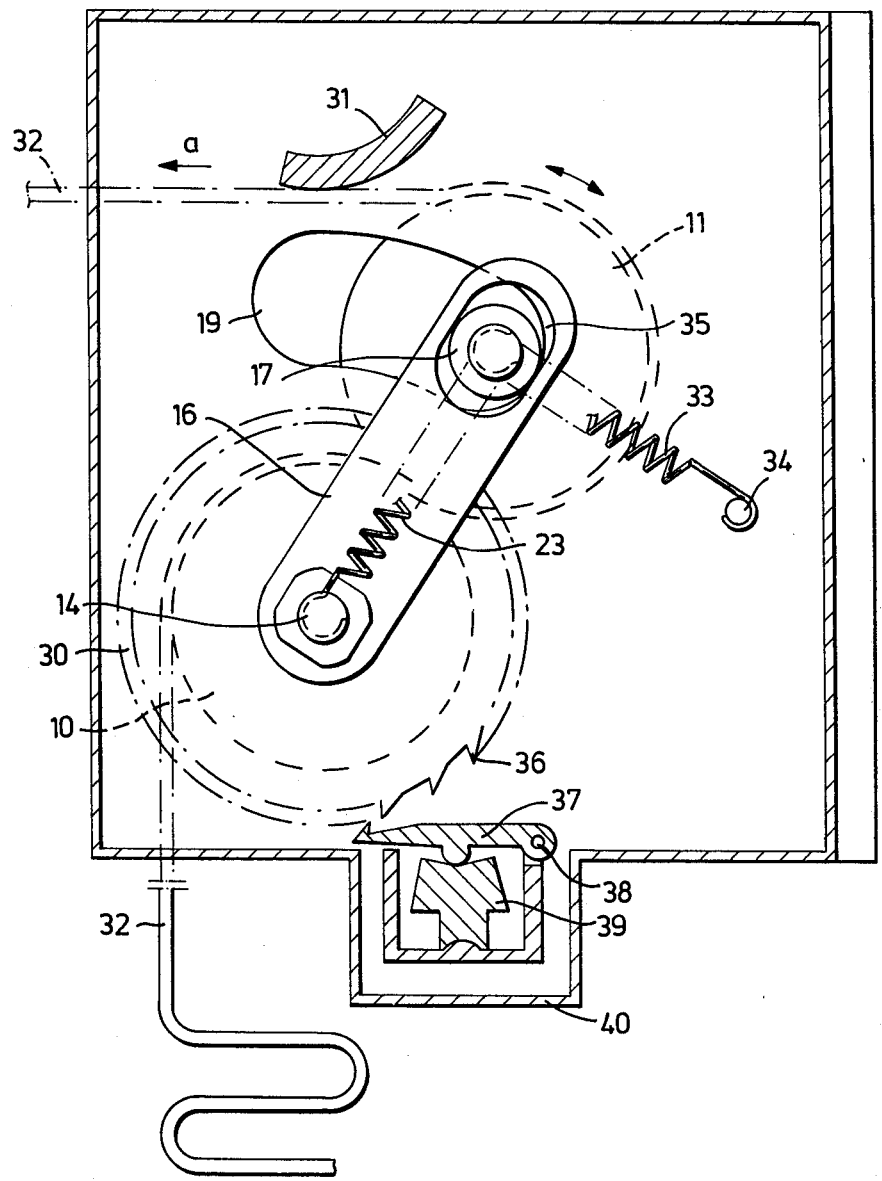
FIG. 2 is a side view of the locking device shown in FIG. 1.

As shown in FIG. 2, a strap 32 of the safety seat belt passes from a space below the rollers, in which the strap is kept when the seat belt is not used around a portion of the first inner roller 10 and between the rollers 10,11 and around a portion of the surface of the second outer roller 11 and then between the second roller 11 and the stop means 31 and out of the locking device. Thus, during extraction of the strap, the strap runs in the direction indicated by the arrow a.

The slots 18 and 19 form a circular arc which is concentric with the shaft 14 of the roller 10, and the shaft 17 of the roller 11 can be moved in these slots. The shaft 17 is arranged to be normally kept at the end of the slot which is remote from the stop means 31, where the roller 11 is not in contact with the stop means and thus, the roller is free to rotate around its axis. Then, also the roller 10 can rotate, so that the strap can be extracted from the space under the locking device, and the roller 11 is in its free position. The roller 11 is maintained in this position by means of a draw spring 33, which is attached between the shaft 17 and a fixed pin 34 mounted on the wall 13. When the shaft is at the other end of the slots 18 and 19, the roller 11 is in contact with the stop means 31 over the strap 32 and is prevented by the stop means for rotating, so that the strap is locked and further extraction of the strap is not possible. Thus, the roller 11 is in the locking position, and also the roller 10 is prevented from rotation. The rollers should have surfaces with a high friction coefficient. The stop means should have a surface with a low friction coefficient, so that the wearing of the strap is low.

The shaft 17 of roller 11 is mounted in elongated slots 35 in the arms 15,16. As a result, the roller 11 always is forced against the roller 10 with a certain spring force due to the action of the springs 22 and 23. Because of the elongated slots, the roller 11 will be stronger forced against the roller 10 due to the shape and position of the stop means 31 thus giving an increased safety in the locking of the strap.

The slots 18,19 can be very short, so that only a small movement is necessary to bring the roller 11 to the locking position, thus ensuring rapid locking.

As shown in FIGS. 1 and 2, the gear wheel 30 on the shaft 14 is along its periphery provided with teeth 36 which are arranged to engage with a pivoting pawl 37. The pawl 37 is rotatably mounted around a fixed pivot 38 and is arranged to be actuated by a tiltable member 39 which is positioned in a recess 40. The tiltable member is so designed that it moves to a tilted position when the vehicle is actuated by an acceleration or retardation over a predetermined limit value. When the tiltable member moves to its tilted position, the pawl 37 is moved to engagement with the gear wheel, so that this can not rotate.

The device described above operates as follows. During slow extraction of the strap, the roller 11 is maintained in its free position by the action of the spring 33 and the rollers 10 and 11 rotate. The helical spring 28 is then tensioned due to the rotation of the shaft 14. This operation continues, until the seat belt has been extended sufficiently for application on a person. In the same way further extension or extraction of the strap is possible, if the person embraced by the seat belt wants to move in the seat belt and, for instance, is leaning forward. During a rapid extraction of the strap, for instance, in case of a rapid braking or a collision when the person in the seat belt is thrown forwards, the roller 11 will immediately be moved to the locking position in which it abuts against the stop means 31 and is forced by this stop means against the undisplaceable roller 10. In this position the rollers can not rotate. The strap is then squeezed both between the stop means 31 and the roller 11 and between the rollers 10 and 11, so that a very safe locking of the strap is provided for preventing further extension of the strap.

When the tiltable member 39 is in its tilted position, for instance due to braking of the vehicle or driving through a bend, the pawl 37 will lock the gear wheel 30, as described above, so that the roller 10 can not rotate any more. In this position, also a slow extension of strap will cause the roller 11 to move to its locking position, so that the strap is locked in the same way as described above.

When the tension in the strap ceases the spring 33 will return the roller 11 to its free position, and when the tiltable member 39, if any, has returned to its normal position, the person wearing the seat belt can again move freely in the same way as before.

The portion of the strap of the seat belt in the housing must have its end attached in the space in one way or another, so that the strap can not be completely withdrawn from the space.

Although only one embodiment of the invention has been described and shown, it is obvious that a number of different embodiments and modifications are possible within the frame of the invention. For instance, the locking of the rollers can be provided without assistance of a stop means or stop surface. The stop means can be shorter, so that it only abuts against a portion of the surface of the moveable or displaceable roller. The extension of the strap must not necessarily be in a direction which is substantially the same as the one in which the movable roller is moved from its free position to its locking position, even if this direction is preferable. Furthermore, the leaving strap must not necessarily run between the stop means and the movable roller, even if this will provide the most effective locking. Instead of two draw springs one single spring can be used, if this is positioned at an angle between the two springs in the embodiment shown. A return spring a wire can be used, one end of which being attached to and following the arm 15 and 16, and the other end of which being attached to one of the walls limiting the space into which the strap is retracted. The spring for retracting the strap can also be positioned otherwise and designed in another way, and the rollers can be mounted in several ways and can also be substantially thinner than shown on the drawings. The movable roller can also be mounted directly in two opposite walls, and the distance between the two rollers can be adapted in such a way that a continuous pressing of the strap is provided without the need of the movable roller being movable also in a direction towards the fixed roller or undisplaceable roller and without the need of a spring force between the rollers.

I claim:

1. A locking device for safety seat belts in vehicles of the type, in which a strap of a seat belt is automatically retracted, at least partly, into a housing, when the seat belt is not used, the locking device comprising a fixed first roller; a first spring means for biasing said first roller for rotation in a direction of retracting said strap; a second, movable roller positioned adjacent to and in parallel with said first roller; means for forcing said second roller against said first roller, so that said strap is passing between said rollers is squeezed therebetween; means for moving said second roller along a circular arcuate path concentric with said first roller between a free position in which said first and second rollers can rotate for extraction of said strap and a locking position, in which said first and second rollers cannot rotate; stop means for stopping said second roller in said locking position and preventing of said second roller as long as it is in said locking position, to which it may be moved by rapid extension of said strap; and second spring means for biasing said second roller towards said free position, so that said movable roller is returned to said free position, when tension in said strap ceases.

2. A locking device according to claim 1, including means provided for urging the peripheral surface of said second roller against the peripheral surface of said first roller.

3. A locking device according to claim 1, wherein means are provided for having said strap leaving said second roller outwards substantially in the direction in which said second roller is moved from its free position to its locking position.

4. A locking device according to claim 1, wherein said stop means ia a fixed stop surface.

5. A locking device according to claim 4, wherein said strap runs between said second roller and said fixed stop surface and is squeezed therebetween when said second roller is in its locking position.

6. A locking device according to claim 4, wherein said fixed stop surface is shaped to force said second roller in its locking position against said first roller.

7. A locking device according to claim 1, including a shaft and two parallel arms, and wherein said first roller is rotatably mounted on said shaft and said second roller is rotatably mounted between said two parallel arms, said arms being rotatably mounted on said shaft of said first roller on each side of said first roller.

8. A locking device according to claim 7, wherein said shaft is mounted in longitudinal slots in said arms, so that said second roller can be moved in a direction towards said first roller, and at least one spring is arranged for forcing said second roller against said first roller.

9. A locking device according to claim 1, wherein said second spring means comprises at least one spring connected to said second roller for returning said second roller to said free position.

10. A locking device according to claim 1, including a shaft on which said first roller is mounted, said shaft being provided with a gear ring, a pawl being provided at the periphery of said gear ring and being actuated by a means sensitive to the position of the vehicle for locking said first roller in response to the movements to the vehicle.

11. A locking device according to claim 1, wherein the surfaces of said rollers have high friction coefficients and said stop means is provided with a surface which has a low friction coefficient.

* * * * *